United States Patent
Hasegawa et al.

[11] Patent Number: 5,834,132
[45] Date of Patent: Nov. 10, 1998

[54] BATTERY TEMPERATURE REGULATING APPARATUS

[75] Inventors: Osamu Hasegawa; Yasuo Kitami; Hiromitsu Sato; Yasuyuki Sando; Koichiro Ozawa, all of Wako, Japan

[73] Assignee: Honda Giken Kogyo Kabushiki Kaisha, Tokyo, Japan

[21] Appl. No.: 552,977
[22] Filed: Nov. 3, 1995
[30] Foreign Application Priority Data
Nov. 14, 1994 [JP] Japan ................................. 6-279383
[51] Int. Cl.⁶ .............................................. H01M 10/50
[52] U.S. Cl. ........................................ 429/62; 429/120
[58] Field of Search ....................................... 429/62, 120

[56] References Cited

U.S. PATENT DOCUMENTS

| | | | |
|---|---|---|---|
| 4,007,315 | 2/1977 | Brinkmann et al. | 429/62 |
| 4,376,809 | 3/1983 | Bindin | 429/62 |
| 4,897,322 | 1/1990 | Jessen | 429/62 |
| 5,447,807 | 9/1995 | Peled et al. | 429/62 |
| 5,460,900 | 10/1995 | Rao et al. | 429/120 X |
| 5,524,681 | 6/1996 | Davies et al. | 429/62 X |

*Primary Examiner*—Stephen Kalafut
*Attorney, Agent, or Firm*—Lyon & Lyon LLP

[57] ABSTRACT

A battery temperature regulating apparatus efficiently controls the charging temperature of a battery assembly which serves as a power source to energize a propulsive motor on an electric vehicle to run on a road. A fluid jacket is disposed in heat exchange relationship with the battery assembly and supplied with a coolant to regulate the temperature of the battery assembly with a radiator or an electric heater for allowing the battery assembly to be charged in a temperature range from 20° C. to 35° C., for example, which is optimum for the charging of the battery assembly. The battery temperature regulating apparatus can maintain the optimum temperature range more reliably than a conventional apparatus which regulates the temperature of the battery assembly as it is charged with a forced flow of hot air or cool air, and can reduce the electric energy consumption to ⅓ of that of the conventional apparatus.

21 Claims, 6 Drawing Sheets

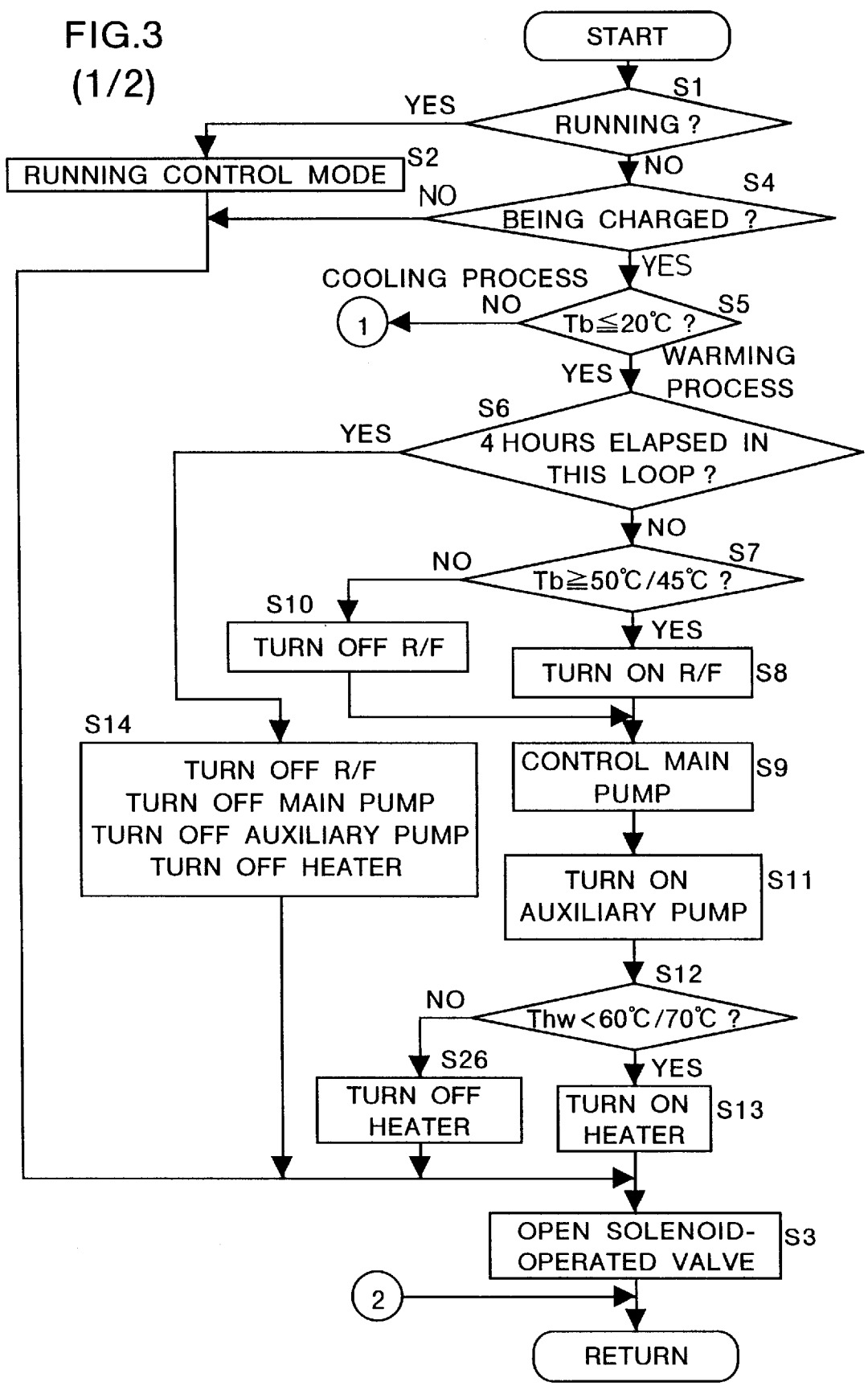
FIG.3 (1/2)

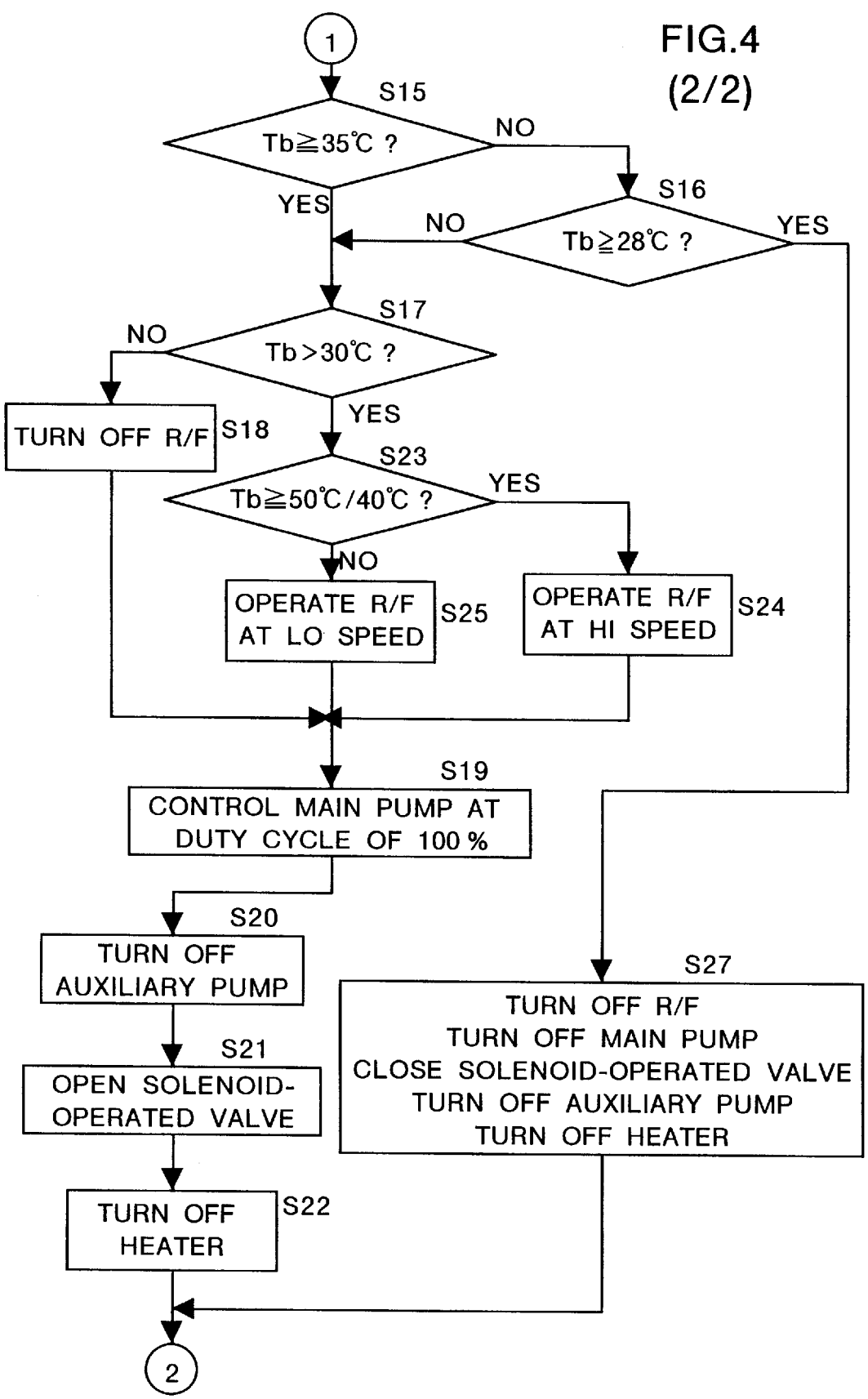

FIG.5

| MODE / DEVICE | RUNNING MODE | PARKING CHARGING MODE | |
|---|---|---|---|
| | | WARMING PROCESS (Tb≦20°C) | COOLING PROCESS (Tb≧30°C) |
| RADIATOR FAN 51 (AT TWO SPEEDS OF HI, LO) | OFF / ON(HI) at Trw(°C) 45→50 | OFF / ON(HI) at Tb(°C) 45→50 | OFF / LO / HI at Tb(°C) 28, 30, 40, 50 |
| MAIN PUMP 14 (DUTY CYCLE CONTROL) | Q(ℓ/m): 2 to 15 over Tpw(°C) 40–45 | Q(ℓ/m): 2 to 15 over Tpw(°C) 40–45 | 15 ℓ/m DUTY CYCLE OF 100% |
| AUXILIARY PUMP 44 (ON/OFF CONTROL) | OFF | ON / OFF at Tb(°C) 20 | OFF |
| DIRECTIONAL CONTROL SOLENOID-OPERATED VALVE 32 | CLOSED | CLOSED | CLOSED / OPEN at Tb(°C) 28→35 |
| ELECTRIC HEATER 45 | OFF | ON / OFF at Thw(°C) 60→70 | OFF |
| SYSTEM SHUTDOWN CONDITIONS | IGNITION SW TURNED OFF (ON CHARGING) | Tb≧20°C OR WARMING TIME OF 4H MAX. | Tb≦28°C | ptu
BATTERY TEMPERATURE REGULATING APPARATUS

BACKGROUND OF THE INVENTION

1. Field of the Invention

The present invention relates to an apparatus for regulating the temperature of a battery assembly mounted as a power source on an electric vehicle to increase the service life of the battery assembly.

2. Description of the Related Art

There have been proposed in recent years electric vehicles whose propulsive electric motor is energized by a motor inverter supplied with electric energy from a battery assembly having a voltage of 240 V or the like.

As is well known in the art, while a battery is being charged, the temperature of the battery increases due to a chemical reaction of the battery solution. If the battery is a lead acid battery, then an excessive increase of the battery temperature evaporates the electrolyte, increasing the concentration of the battery solution. When the concentration of the battery solution is increased, the negative electrode of the battery is sulfated thereby to lower the capacity of the battery. The excessive temperature increase also accelerates corrosion and degradation of the positive electrode. Therefore, when the battery temperature suffers an excessive increase, the battery performance is lowered, and the service life of the battery is shortened.

Since the batteries on an electric vehicle serve as a power supply to supply electric energy for propelling the electric vehicle, and also since a reduction in the battery performance affects the fundamental capabilities of the electric vehicle, i.e., the mileage and horsepower of the electric vehicle, any reduction in the battery performance should be minimized.

According to a system that has been proposed, when the temperature of the batteries increases while they are being charged, a fan mounted on a housing which accommodates the batteries is actuated to introduce ambient air into the housing and apply the air to the batteries for thereby cooling the batteries.

It is known that when the batteries on an electric vehicle are charged after the temperature of the batteries on an electric vehicle has decreased due to a reduction in the ambient temperature in winter or a cold climate, the service life of the batteries is shortened and the mileage of the electric vehicle after the batteries are fully charged is reduced.

A battery heating system has been proposed which includes a heater disposed between a fan and the batteries for applying hot air to the batteries when the batteries are cold in cold environments.

The above conventional systems for regulating the temperature of batteries employ a medium of air for cooling and heating the batteries. The medium of air, however, has low heat transfer efficiency especially when it is used to heat the batteries. As a result, the systems cause an excessive consumption of electric energy by the fan and the heater for temperature regulation.

SUMMARY OF THE INVENTION

It is a general object of the present invention to provide a battery temperature regulating apparatus capable of establishing good temperature environments in which batteries serving as a power source for an electric vehicle operate.

A main object of the present invention is to provide a battery temperature regulating apparatus capable of establishing good temperature environments in which batteries serving as a power source for an electric vehicle operate, through a simple arrangement and at a low cost.

Another object of the present invention is to provide a battery temperature regulating apparatus capable of maintaining good temperature environments in which batteries serving as a power source for an electric vehicle operate, with a reduced heat loss.

Still another object of the present invention is to provide a battery temperature regulating apparatus having a directional control valve which is capable of selectively introducing a heat-exchange fluid heated by a heater and a heat-exchange fluid cooled by a radiator into a heat-exchange fluid path in a battery box, so that the battery temperature regulating apparatus can heat and cool batteries with high efficiency.

Yet still another object of the present invention is to provide a battery temperature regulating apparatus which has a solenoid-operated valve that brings a heat-exchange fluid path into communication with a heater when not actuated, so that a battery assembly will be kept at a suitable temperature since it is not unduly cooled but warmed.

A further object of the present invention is to provide a battery temperature regulating apparatus which has a radiator and a radiator fan for cooling a battery assembly to an optimum temperature range and keeping the battery assembly in the optimum temperature range.

A still further object of the present invention is to provide a battery temperature regulating apparatus having a radiator fan whose rotational speed varies depending on a battery temperature, so that any energy loss produced upon operation of the radiator fan can be reduced and heat produced upon operation of the radiator fan can also be reduced.

A yet still further object of the present invention is to provide a battery temperature regulating apparatus having a heater for heating a battery assembly when the temperature of the battery assembly is lowered, for thereby increasing the temperature of the battery assembly to an optimum temperature range and keeping the temperature of the battery assembly in the optimum temperature range.

Another object of the present invention is to provide a battery temperature regulating apparatus which has a timer means for suppressing an energy loss caused if a battery assembly cannot be heated by a heater when the battery assembly is to be heated by the heater.

Still another object of the present invention is to provide a battery temperature regulating apparatus capable of turning off a heater when the temperature of a battery assembly as heated by the heater increases excessively, so that the battery assembly is prevented from being excessively heated.

Yet still another object of the present invention is to provide a battery temperature regulating apparatus which has heating and cooling units that are operated to heat and cool a battery assembly, so that the battery assembly can be heated and cooled not by electric energy from the battery assembly, but by electric energy from an external source, i.e., electric energy supplied to charge the battery assembly, for thereby keeping the battery assembly in a temperature range optimum for the charging of the battery assembly, and maintaining a desired charging capacity for the battery assembly.

A further object of the present invention is to provide a battery temperature regulating apparatus which can control the temperature of a battery assembly based on the temperature of a radiator fluid.

The above and other objects, features, and advantages of the present invention will become more apparent from the following description when taken in conjunction with the accompanying drawings in which preferred embodiments of the present invention are shown by way of example.

BRIEF DESCRIPTION OF THE DRAWINGS

FIG. 3 is a flowchart of one portion (1/2) of an operation sequence of the battery temperature regulating apparatus shown in FIG. 1;

FIG. 4 is a flowchart of the other portion (2/2) of the operation sequence of the battery temperature regulating apparatus shown in FIG. 1;

FIG. 5 is a table of operation statuses of various components of the battery temperature regulating apparatus shown in FIG. 1.

DETAILED DESCRIPTION OF THE PREFERRED EMBODIMENTS

Figure 1:
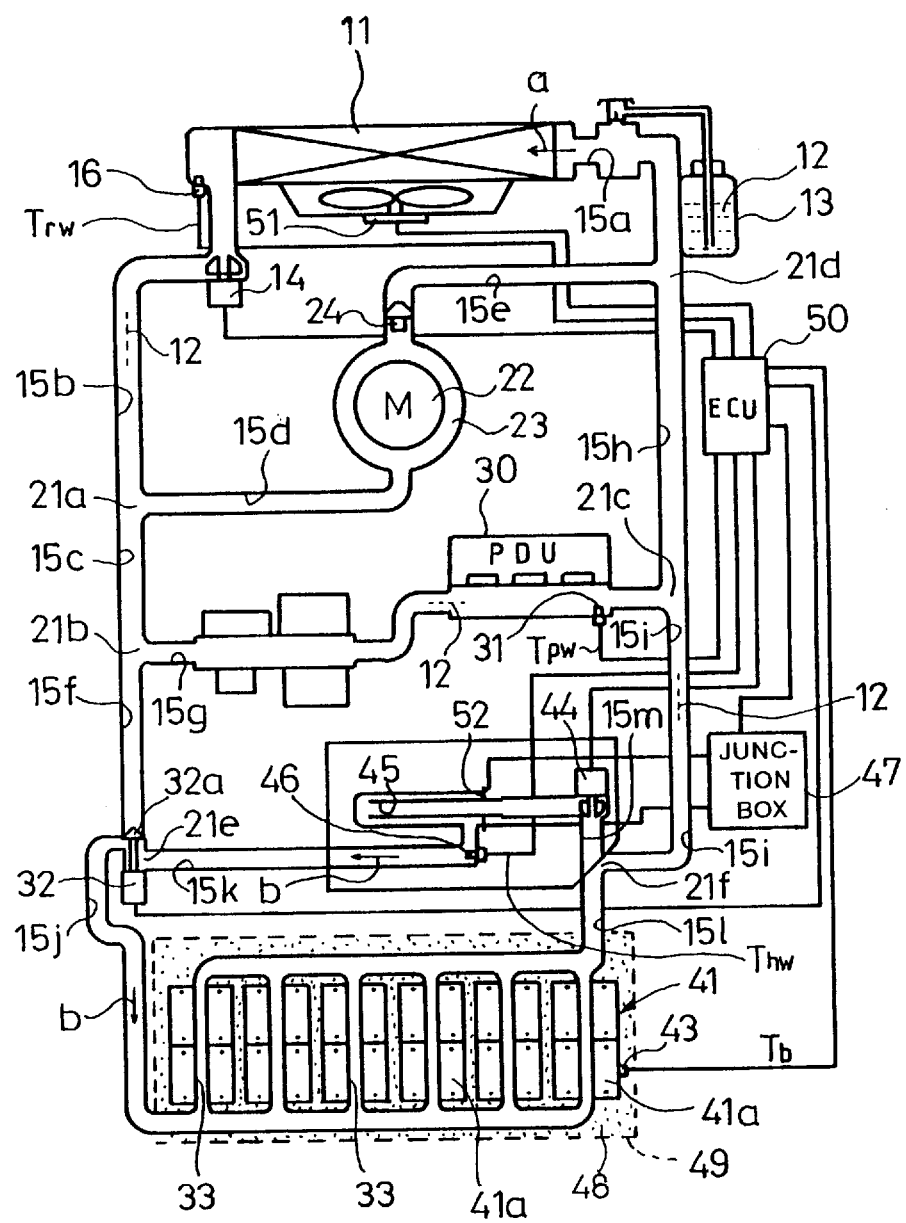
FIG. 1 is a schematic diagram of a battery temperature regulating apparatus according to an embodiment of the present invention.

FIG. 1 schematically shows a battery temperature regulating apparatus according to an embodiment of the present invention.

As shown in FIG. 1, a radiator 11 is disposed as a cooling means inwardly of the front grill of an electric vehicle (not shown). A supplemental liquid tank 13 for storing a temperature regulating liquid (hereinafter referred to as a "liquid") 12 such as a coolant or the like is positioned upstream of the radiator 11 with respect to the direction in which the liquid flows through the radiator 11. The liquid tank 13 is connected through a tube to a passageway 15a which is connected to an upstream end of the radiator 11. The liquid 12 flows through a passage 15 which is composed of passageways 15a, 15b, ...

A temperature sensor 16 as a temperature detecting means is disposed in the passageway 15b which is connected to a downstream end of the radiator 11. A main pump 14 is also disposed in the passageway 15b immediately downstream of the temperature sensor 16. When the main pump 14, which is a motor-driven pump, is operated, the liquid 12 from the passageway 15a is drawn through the radiator 11 in the direction indicated by the arrow "a" into the passageway 15b.

The passageway 15b is divided into passageways 15c, 15d at a first branch point 21a that is located downstream of the main pump 14.

The passageway 15d is connected to a passageway 15e through a jacket 23, which serves as a heat-exchange path (heat-exchange fluid path) for cooling a propulsive motor 22, and a thermostat valve 24. When the temperature of the liquid in the communication from passageway 15e is lower than a preset temperature, the thermostat valve 24 closes the passageway 15d, to passageway 15e thereby reducing loads on the main pump 14.

The passageway 15c is divided into passageways 15f, 15g at a second branch point 21b that is located downstream of the passageway 15c.

The passageway 15g serves as a passageway for cooling high-pressure/accessory systems. The passageway 15g is combined with a power driving unit (PDU) 30 for energizing the propulsive motor 22. A temperature sensor 31 as a liquid temperature detecting means (temperature detector) is disposed in the passageway 15g downstream of the power driving unit 30.

The passageway 15g is divided into passageways 15h, 15i at a third branch point 21c that is located downstream of the temperature sensor 31.

The liquid 12 flowing from the passageway 15g and the liquid 12 flowing from the passageway 15i are united with each other at the third branch point 21c, and flow into the passageway 15h.

The passageway 15h is divided into passageways 15e, 15a at a fourth branch point 21d that is located downstream of the passageway 15h.

The passageway 15f is divided into passageways 15j, 15k at a fifth branch point 21e that is located downstream of the passageway 15f. A directional control solenoid-operated valve 32 serving as a directional control valve is disposed in the fifth branch point 21e. When a valve body 32a of the directional control solenoid-operated valve 32 projects as shown in FIG. 1, it closes the passageway 15f, bringing the passageways 15j, 15k into communication with each other. When the valve body 32a is retracted, it closes the passageway 15k, bringing the passageways 15f, 15j into communication with each other. The directional control solenoid-operated valve 32 is referred to as being in a closed position when the valve body 32a projects as shown, and as being in an open position when the valve body 32 is retracted. When the directional control solenoid-operated valve 32 is not supplied with an electric signal (current), i.e., not energized, it is in the closed position as shown.

A jacket 33 which serves as a heat-exchange path (heat-exchange fluid path) for regulating the temperature of a battery assembly 41 is connected to the passageway 15j at a downstream side thereof. The battery assembly 41 is composed of a set of element batteries 41a. A passageway 15l extends downstream from the jacket 33. The passageway 15l is divided into passageways 15m, 15i at a sixth branch point 21f that is located downstream of the passageway 15l. A temperature sensor 43 as a battery temperature detecting means (battery temperature detector) is mounted on a side wall of one of the element batteries 41a which is positioned at the most downstream end of the jacket 33. However, the battery temperature detecting means may comprise a plurality of temperature sensors associated with the respective element batteries 41a, and may detect the average temperature of the element batteries 41a.

The element batteries 41a have respective casings that are cooled through a heat exchange by the liquid 12 such as a coolant or the like which flows through the jacket 33. The element batteries 41a are housed in a battery box 49 indicated by the broken lines. A heat insulating material 48 of glass wool or the like is attached to outer surfaces of the element batteries 41a and the jacket 33 within the inner wall of the battery box 49 for preventing the temperature Tb of the battery assembly 41 from being easily affected by the ambient temperature.

An auxiliary pump 44 which comprises a motor-driven pump is disposed immediately downstream of the passageway 15m. When the auxiliary pump 44 operates, the liquid 12 flows in the direction indicated by the arrow "b" and is heated by an electric heater 45 serving has a warming means (heating means). The temperature of the heated liquid 12 is detected by a temperature sensor 46 as a liquid temperature detecting means. The heated liquid 12 is supplied through the passageways 15k, 15j to the jacket 33 when the directional control solenoid-operated valve 32 is closed.

The electric heater 45 has a terminal connected directly to a junction box 47 and another terminal connected through a temperature fuse 52 to the junction box 47. The junction box 47, which houses switches or contactors, has a control terminal that is connected to an electronic control unit (ECU) 50 which also serves as a temperature control means. The contactors in the junction box 47 are switched on and off by the ECU 50.

The ECU 50 comprises a microcomputer, for example, which is provided as an LSI device having a microprocessor unit (MPU) equivalent to a central processing unit (CPU), an A/D converter, a D/A converter, and I/O ports which are connected to the microprocessor unit, a read-only memory (ROM) storing a system program and other data, and a random-access memory (RAM), which is a read/write memory, for temporarily storing processed data, a timer circuit as a timing means, an interrupt processing circuit, etc., all integrated on one chip. The RAM is backed up by a low-voltage battery which will be described below.

The ECU 50 is connected to the temperature sensors 16, 31, 43, 46, and reads a radiator outlet liquid temperature Trw, a PDU outlet liquid temperature Tpw, a battery temperature Tb, and a heater outlet liquid temperature Thw from these temperature sensors 16, 31, 43, 46. Based on the read temperatures, the ECU 50 controls a fan motor 51 (radiator fan (R/F)) for cooling the radiator 11, the main pump 14, the directional control solenoid-operated valve 32, the junction box 47, the electric heater 45, and the auxiliary pump 44. The radiator fan 51 is positioned in facing relation to the radiator 11.

Figure 2:
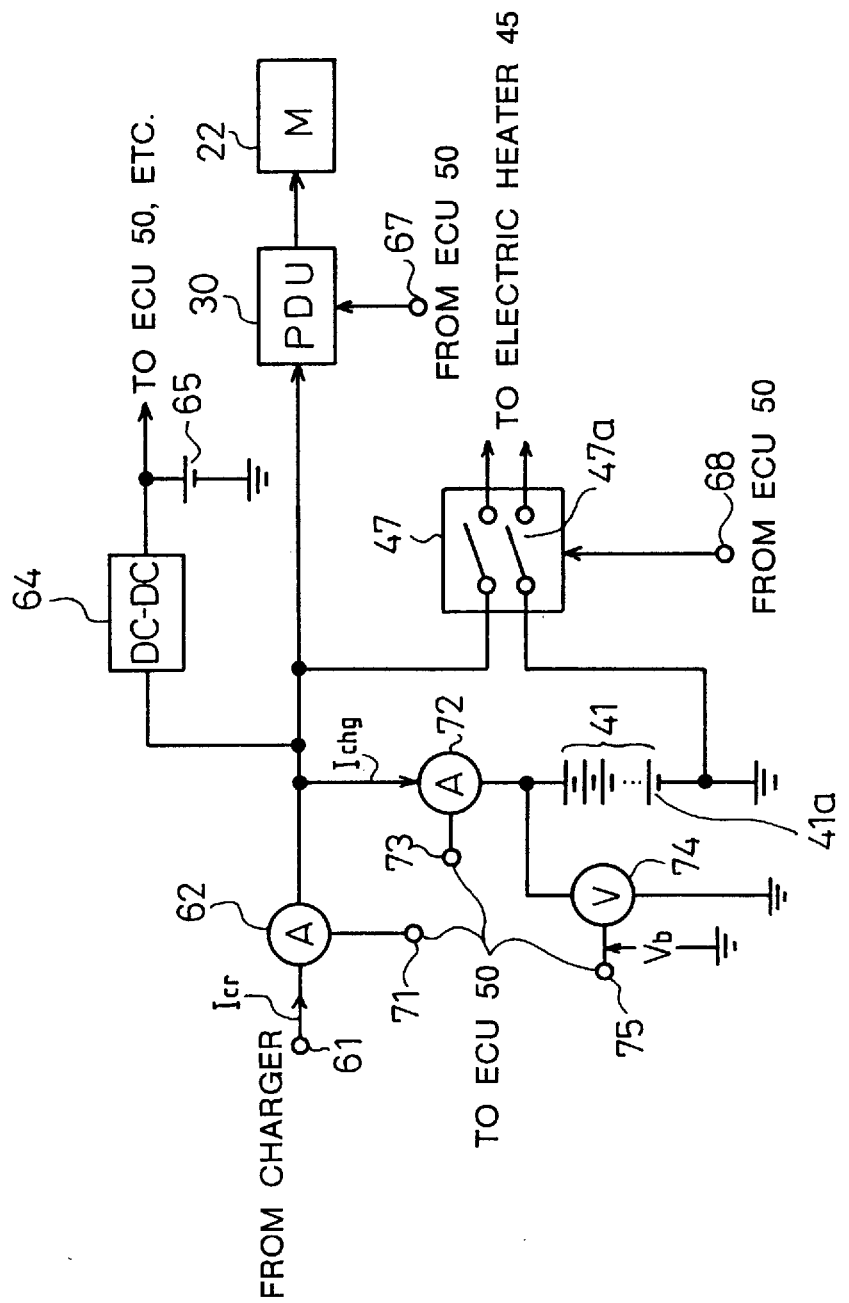
FIG. 2 is a circuit diagram of a power supply system of the battery temperature regulating apparatus.

FIG. 2 shows a power supply system of the battery temperature regulating apparatus.

As shown in FIG. 2, a terminal 61 is connected to a vehicle-mounted charger (not shown) or an external charger (not shown), and supplied with charging electric power from an external AC power supply such as an AC power supply at home or an AC power supply at a charging station through the vehicle-mounted charger or the external charger.

A charger output current Icr from the terminal 61 is detected by a current sensor 62 as a current detecting means, and recognized by the ECU 50 through a terminal 71.

To an output terminal of the current sensor 62, there is connected the hot or positive terminal of the battery assembly 41 through a current sensor 72 which detects a charging current Ichg. The positive terminal of the battery assembly 41 is connected through a direct current-to-direct current (DC/DC) converter 64 to a low-voltage battery 65 having a voltage of +12 V or the like. The voltage of the low-voltage battery 65 is supplied as electric power to the ECU 50, etc., including a power supply for backing up the RAM, and also supplied through the ECU 50 to the fan motor 51, the main pump 14, and other components.

The positive terminal of the battery assembly 41 is also connected through the power driving unit 30 to the propulsive motor 22, which comprises a three-phase induction motor. The power driving unit 30 has a three-phase inverter whose duty cycle is controlled by a control signal (duty signal) that is supplied from the ECU 50 through a terminal 67.

The positive terminal of the battery assembly 41 is also connected through the current sensor 72 and the junction box 47 to the electric heater 45. When a contactor (contacts) 47a in the junction box 47 is closed, the battery assembly 41 supplies or battery charger a high voltage to the electric heater 45 to turn on or energize the electric heater 45, which thus generates heat. The contactor 47a in the junction box 47 can be opened and closed by a control signal that is supplied from the ECU 50 through a terminal 68.

The charging current Ichg detected by the current sensor 72 is supplied through a terminal 73 to the ECU 50. A voltage sensor 74 is connected across the battery assembly 41 for supplying a battery voltage Vb through a terminal 75 to the ECU 50. The charging current Ichg can be kept at a predetermined level by a feedback control loop between the ECU 50 and the non-illustrated charger.

FIGS. 3 and 4 together comprise a flowchart of an operation sequence of the battery temperature regulating apparatus shown in FIG. 1. In the flowchart, the ECU 50 makes various decisions and effects the control operations.

FIG. 5 is a table of operation statuses of various components of the battery temperature regulating apparatus shown in FIG. 1.

Operation of the battery temperature regulating apparatus shown in FIG. 1 will now be described below with reference to FIGS. 3 through 5.

The ECU 50 determines in a step S1 whether the electric vehicle is running or not based on the status of an ignition switch (not shown) or the status of the propulsive motor 22.

If the electric vehicle is running, then the directional control solenoid-operated valve 32 is brought into the closed position as shown in FIG. 1, closing the passageway 15f connected to the radiator 11 and the passageway 15j connected to the battery assembly 41. When not energized, the directional control solenoid-operated valve 32 is closed under the bias of a spring.

While the electric vehicle is running, the ECU 50 carries out a running control mode in a step S2. The running control mode in the step S2 will be described below with reference to "RUNNING MODE" in FIG. 5. At this time, the auxiliary pump 44 is turned off, and the liquid 12 in the jacket 33 surrounding the battery assembly 41 stays still, not flowing. The electric heater 45 is turned off.

During the running of the electric vehicle, power semiconductor devices such as IGBTs or the like which make up the power driving unit 30 are heated, and their temperature is detected as the PDU outlet liquid temperature Tpw by the temperature sensor 31. If the PDU outlet liquid temperature Tpw is equal to or less than 40° C., then the main pump 14 is controlled to discharge the liquid 12 at a rate of 2 liters/minute. If the PDU outlet liquid temperature Tpw is equal to or higher than 45° C., then the main pump 14 is controlled to discharge the liquid 12 at a rate of 15 liters/minute in order to increase the cooling effect of the liquid 12. If the PDU outlet liquid temperature Tpw is in the range between 40° C. to 45° C., then the main pump 14 is controlled continuously in its duty cycle to discharge the liquid 12 at a rate in the range of from 2 to 15 liters/minute. Therefore, the duty cycle of the main pump 14 is 100% when it discharges the liquid 12 at rate of 15 liters/minute, and 30% when it discharges the liquid 12 at rate of 2 liters/minute.

If the radiator outlet liquid temperature Trw exceeds 50° C., then the radiator fan 51 is controlled to draw air at a high rate (high-speed control). If the radiator outlet liquid temperature Trw drops from 50° C. and reaches a temperature equal to or lower than 45° C., then the radiator fan 51 is stopped. The radiator fan 51 is thus controlled according to a hysteresis loop.

In this manner, the ECU 50 controls the radiator fan 51 and the main pump 14 to cool the propulsive motor 22 and the power driving unit 30 as required during the running of the electric vehicle. The system for carrying out the running control mode is shut off when the ignition switch is detected as being turned off. When the system is shut off, control proceeds to a step S3 in which the ECU 50 closes the directional control solenoid-operated valve 32 as shown in FIG. 1. In this case, the directional control solenoid-operated valve 32 remains closed. Thereafter, control goes back to the step S1.

If the electric vehicle is not running ("NO" in the step S1), then the ECU 50 determines whether the battery assembly 41 is being charged or not in a step S4, basically based on whether the charger output current Icr is flowing through the current sensor 62 or not. However, since the ECU 50 is connected to the non-illustrated vehicle-mounted charger or external charger, the ECU 50 may determine whether the battery assembly 41 is being charged or not through communications with the vehicle-mounted charger or external charger.

If the electric vehicle is not running and also if the battery assembly 41 is not being charged ("NO" in the step S4), or, stated otherwise, if the electric vehicle is simply parked in a parking lot or the like, then the ECU 50 keeps the directional control solenoid-operated valve 32 closed in the step S3, and effects no temperature control on the battery assembly 41.

If the battery assembly 41 is being charged in the step S4, then the ECU 50 determines whether the battery temperature Tb is equal to or less than 20° C. or not in a step S5. If the battery temperature Tb is equal to or less than 20° C., then the ECU 50 carries out a warming process (heating process) while the electric vehicle is stopped (parked) in a step S6 and following steps. It is known that if the battery assembly 41 were charged when the battery temperature Tb is 20° C. or lower, the service life of the battery assembly 41 would be lowered to about ⅓ of the service life achieved if the battery assembly 41 is charged when the battery temperature Tb is higher than 20° C., and the capacity of the battery assembly 41 would become so small that the mileage of the electric vehicle will be about 20% reduced after the battery assembly 41 is fully charged. The ECU 50 effects the warming process in order to avoid these drawbacks.

In a step S6, the ECU 50 starts a 4-hour timer to effect the warming process for 4 hours. In 4 hours, the battery assembly 41 can be charged up to 80% of its fully charged capacity. The period of 4 hours may be changed to a suitable period of time depending on the specifications of the battery assembly 41 and the charging current.

If the battery assembly 41 starts being charged when the battery temperature Tb is equal to or less than 20° C. ("YES" in the step S5 and "NO" in the step S6), then the ECU 50 measures the battery temperature Tb and determines whether the battery temperature Tb is equal to or higher than 50° C. in a step S7. If the battery temperature Tb is equal to or higher than 50° C., then the radiator fan 51 is rotated at high speed in the same manner as with the running control mode in the step S2, in a step S8. Then, the main pump 14 is controlled at a duty cycle of 100% in a step S9.

The radiator fan 51 is operated and the main pump 14 is controlled in its duty cycle in a warming process in a parking charging mode shown in FIG. 5 in the same manner as with the running control mode in the step S2. In the parking charging mode, the battery temperature Tb may reach 50° C. or more immediately after the electric vehicle has stopped.

If the battery temperature Tb is equal to or higher than 50° C., then the liquid 12 functions as a cooling liquid, cooling the propulsive motor 22 to prevent its output power from being reduced, and also cooling the power driving unit 30 to prevent the semiconductor devices, etc. from being destroyed.

If the battery temperature Tb is lower than 45° C. in the step S7 (the numeral on the right-hand side of "/" in each of the decision steps in the flowchart represents a threshold value for negation "NO"), then since the propulsive motor 22 is not so heated as to require the radiator fan 51 to be rotated, the radiator fan 51 is stopped in a step S10, and the main pump 14 is controlled in its duty cycle based on the PDU outlet liquid temperature Tpw in the step S9 (see the status of the main pump 14 in the warming process in the parking charging mode shown in FIG. 5).

Thereafter, the auxiliary pump 44 is turned on in a step S11. The liquid 12 now circulates in the direction indicated by the arrow "b". Specifically, the liquid 12 flows from the auxiliary pump 44 through the passageways 15k, 15j and the jacket 33 in which it warms the battery assembly 41, and then flows through the passageway 15m back to the auxiliary pump 44.

Thereafter, the ECU 50 determines whether the heater outlet liquid temperature Thw is lower than 60° C. or not in a step S12. If the heater outlet liquid temperature Thw is lower than 60° C., then the electric heater 45 is turned on in a step S13. The liquid 12 is warmed thereby to warm the battery assembly 41 through the jacket 33. The battery temperature Tb is continuously monitored by the ECU 50.

If the temperature of the liquid 12, i.e., the heater outlet liquid temperature Thw is equal to or higher than 70° C. ("NO" in the step S12), then since the battery assembly 41 can sufficiently be warmed at this temperature, the electric heater 45 is turned off in a step S26, and the battery assembly 41 is warmed by the liquid 12.

Then, the ECU 50 closes the directional control solenoid-operated valve 32, i.e., keeps the directional control solenoid-operated valve 32 closed in this case, in the step S3. Thereafter, the ECU 50 repeats the steps Si through S13 until the charging time of 4 hours elapses in the step S6. When the charging time of 4 hours elapses in the step S6, the ECU 50 turns off the radiator fan 51 if it has been turned on, turns off the main pump 14, turns off the auxiliary pump 44, if necessary, and turns off the electric heater 45 in a step S14. The ECU 50 turns off the auxiliary pump 44 only if necessary because if the battery assembly 41 is to be continuously charged with a small charging current after elapse of the charging time of 4 hours, then the battery temperature Tb can be prevented from dropping quickly by keeping the auxiliary pump 44 turned on.

While the battery assembly 41 is being charged, the main pump 14, the auxiliary pump 44, and other components are energized not by the battery assembly 41, but by a portion of the charger output current Icr supplied through the DC/DC converter 64, because priority is given to the charging of the battery assembly 41. For the same reason, the electric heater 45 is energized by a portion of the charger output current Icr.

The system for carrying out the warming process in the parking charging mode is shut off when the battery temperature Tb exceeds 20° C. ("YES" in the step S5) or if the warming process has been carried out for 4 hours ("YES" in the step S6).

If the battery assembly 41 is being charged ("YES" in the step S4) and the battery temperature Tb exceeds 20° C.

("YES" in the step S5), then the ECU 50 executes a cooling process for cooling the battery assembly 41. In the cooling process, the ECU 50 determines whether the battery temperature Tb is equal to or higher than 35° C. or not in a step S15 (FIG. 4).

If the battery temperature Tb is less than 35° C., then the ECU 50 determines whether the battery temperature Tb is less than 28° C. or not in a step S16.

If the battery temperature Tb is less than 28° C., then since the battery temperature Tb is held in a normal temperature range, i.e., an optimum temperature range (20° C. <Tb<28° C.) for the charging control process, the ECU 50 turns off the radiator fan 51, the main pump 14, the auxiliary pump 44, and the electric heater 45, keeps the directional control solenoid-operated valve 32 closed, and effects the charging control process for the battery assembly 41 in a step S27.

The charging control process for the battery assembly 41 may comprise a two-step current control process in which, if the battery assembly 41 has a capacity C, then the battery assembly 41 is charged with a charging current Ichg of 0.2 C for 4 hours from the beginning of the charging control process, so that the battery assembly 41 can be charged up to 0.8 C, and thereafter the battery assembly 41 is fully charged with a charging current Ichg of 0.05 C for subsequent 4 hours, so that the battery assembly 41 can be charged up to 1.0 C.

If the battery temperature Tb is equal to or higher than 35° C. ("YES" in the step S15) or if the battery temperature Tb is in excess of 28° C. ("NO" in the step S16), then the ECU 50 initiates the cooling process for cooling the battery assembly 41 with the temperature- regulating liquid 12 which flows through the radiator 11.

In the cooling process, the ECU 50 determines whether the battery temperature Tb is higher than 30° C. or not in a step S17.

If the battery temperature Tb is equal to or less than 30° C., then since the liquid 12 is cold, the ECU 50 turns off the radiator fan 51 in a step S18.

Thereafter, the ECU 50 controls the main pump 14 to operate at a duty cycle of 100%, i.e., to discharge the liquid 12 at a rate of 15 liters/minute, in a step S19, and then turns off the auxiliary pump 44 in a step S20.

The ECU 50 opens the directional control solenoid-operated valve 32 in a step S21, bringing the passageways 15$f$, 15$j$ into communication with each other and disconnecting the passageway 15$k$ from the passageways 15$j$, 15$f$. Then, the ECU 50 turns off the electric heater 45 in a step S22.

When the steps S18 through S21 are executed, the liquid 12 that has been cooled through a heat exchange by the radiator 11 flows through the passageways 15$b$, 15$c$, 15$f$, 15$j$ into the jacket 33. The liquid 12 as it flows through the jacket 33 cools the battery assembly 41. The liquid which is warmed by the battery assembly 41 then flows through the passageways 15$l$, 15$i$, 15$h$, 15$a$ back into the radiator 11. The liquid 12 is then cooled by the radiator 11, and more effectively through a heat exchange when the radiator fan 51 is rotated.

The battery assembly 41 can continuously and efficiently be cooled by the liquid 12 thus cooled.

If the battery temperature Tb is higher than 30° C. ("YES" in the step S17), then the ECU 50 determines whether the battery temperature Tb is equal to or higher than 50° C. or not in a step S23.

If the battery temperature Tb is equal to or higher than 50° C., then the ECU 50 rotates the radiator fan 51 at a high speed (step S24) to cool the radiator 11 with air drawn at a high rate, thereby cooling the liquid 12. Thereafter, the steps S19 through S22 are carried out to cool the battery assembly 41. If the battery temperature Tb exceeds 30° C. in the step S17, but is lower than 40° C. in the step S23, then the ECU 50 rotates the radiator fan 51 at a low speed (step S25) to cool the radiator 11 with air drawn at a low rate, thereby cooling the liquid 12. Thereafter, the steps S19 through S22 are carried out to cool the battery assembly 41.

A cooling process in the parking charging mode will be described below with reference to FIG. 5.

The radiator fan 51 rotates at a low speed (LO) when the battery temperature Tb increases from 40° C. to 50° C., and at a high speed (HI) when the battery temperature Tb exceeds 50° C. When the battery temperature Tb decreases from 50° C. to 40° C., the radiator fan 51 rotates at the high speed (HI) because of a hysteresis loop. When the battery temperature Tb decreases from 40° C. to 28° C., the radiator fan 51 rotates at the low speed (LO). When the battery temperature Tb is equal to or lower than 28° C., the radiator fan 51 is stopped because there is no need to cool the liquid 12. When the battery temperature Tb increases from 28° C. to 30° C., the radiator fan 51 remains stopped by an on-off control operation with hysteresis. When the battery temperature Tb exceeds 30° C., the radiator fan 51 rotates again at the low speed (LO).

During the cooling process in the parking charging mode, the main pump 14 is controlled to operate at a full duty cycle, i.e., a duty cycle of 100%, to discharge the liquid 12 at a rate of 15 liters/minute, and the auxiliary pump 44 remains turned off.

Insofar as the battery temperature Tb exceeds 35° C., the directional control solenoid-operated valve 32 is open, closing the passageway 15$k$ and bringing the passageways 15$f$, 15$j$ into communication with each other, so that the battery 41 is cooled by the liquid 12 which has passed through the radiator 11. When the battery temperature Tb drops from above 35° C. to 28° C. or below, since it is not necessary to cool the battery 41, the directional control solenoid-operated valve 32 is brought into the closed position as shown in FIG. 1. The directional control solenoid-operated valve 32 remains closed while the battery temperature Tb increases from below 28° C. up to 35° C., and is opened when the battery temperature Tb exceeds 35° C. The electric heater 45 remains turned off.

The system for carrying out the cooling process in the parking charging mode is shut off when the battery temperature Tb falls to 28° C. or below.

In the above process of controlling the temperature of the battery 41, the above temperature settings are basically selected such that the battery 41 will be warmed when the battery temperature Tb is equal to or lower than 20° C., and will be cooled when the battery temperature Tb is equal to or higher than 35° C. The temperature settings are examples of a recommended temperature range in the case where the battery assembly 41 is composed of lead-acid batteries. If the battery assembly 41 is composed of batteries of another type or the material, thickness, etc. of the casings of the battery assembly 41 are changed, then there is another temperature range optimum for the battery assembly 41. Therefore, the above temperature settings are given by way of example only, and may be changed to other values in a temperature range optimum for charging the battery assembly 41. Since the above temperature settings are merely examples, the words associated with these temperature settings, e.g., "equal to or less than", "equal to or higher than", "less than", "exceeds", etc. should not be interpreted in terms of their strict senses.

In the embodiment shown in FIG. 1, the jacket 33 is disposed near the battery assembly 41, and the liquid 12 is supplied to the jacket 33 to regulate the temperature of the battery assembly 41 with the liquid 12 which has been cooled by the radiator 11, heated by the electric heater 45, or cooled by itself, for allowing the battery assembly 41 to be charged in a temperature range from 20° C. to 40° C., for example, which is optimum for the charging of the battery assembly 41. Since the liquid 12 supplied to the jacket 33 has a higher heat transfer efficiency than the conventional air-cooling system in which the temperature of the batteries as they are charged is regulated by forced warm or cool air, it is possible to keep the battery assembly 41 reliably in the above optimum temperature range while the battery assembly 41 is being charged, and also to reduce the electric power consumption to about ⅓ of that of the conventional system.

While the operation of the radiator fan 51 is controlled based on the battery temperature Tb, it may be controlled based on the radiator outlet liquid temperature Trw used in the steps S7, S17, and S23 in the operation sequence shown in FIGS. 3 and 4.

Figure 6:
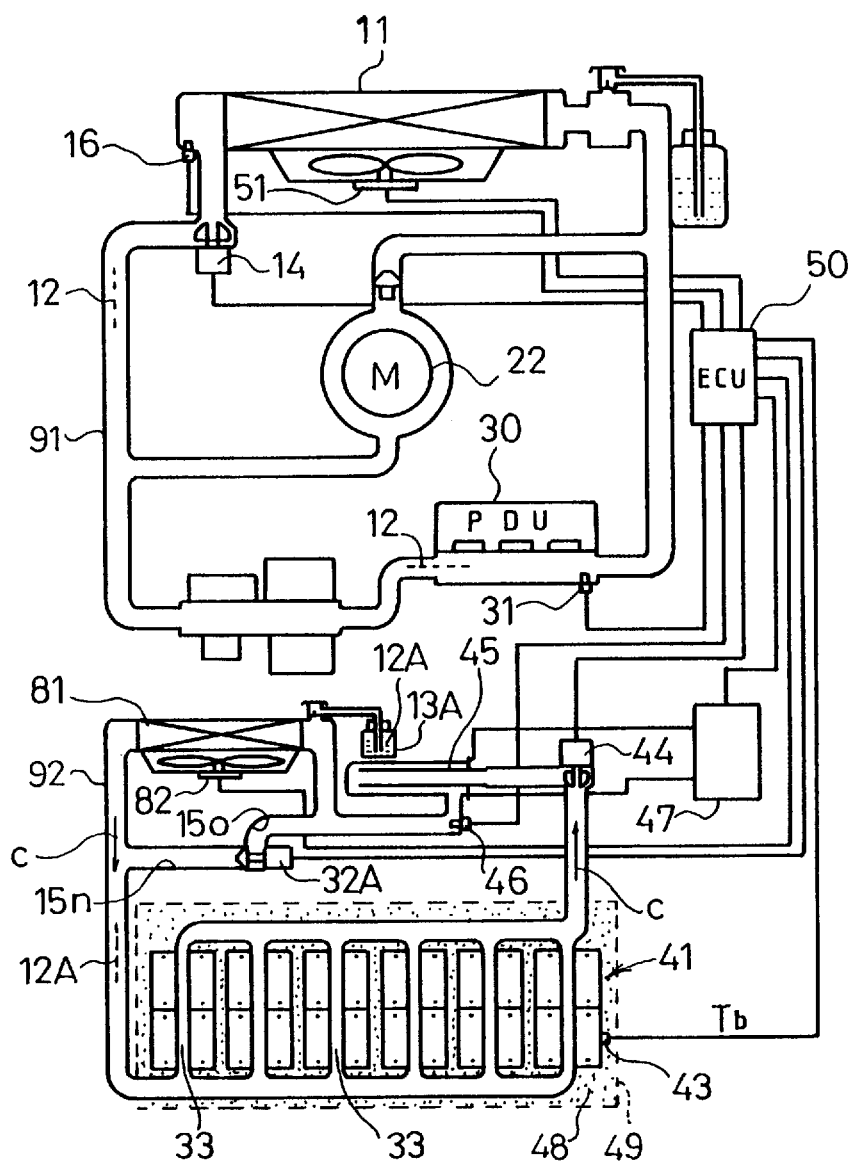
FIG. 6 is a schematic diagram of a battery temperature regulating apparatus according to another embodiment of the present invention.

FIG. 6 schematically shows a battery temperature regulating apparatus according to another embodiment of the present invention. Those parts shown in FIG. 6 which correspond to those shown in FIG. 1 are denoted by identical reference numerals or identical reference numerals with a suffix "A", and will not be described in detail below.

The background of the embodiment shown in FIG. 6 and how it differs from the embodiment of FIG. 1 is as follows: As described above, the radiator 11 is disposed inwardly of the front grill of the electric vehicle for cooling the propulsive motor 22 while the electric vehicle is running, so that the ram effect on the radiator 11 to cool the same will be high during the running of the electric vehicle. The temperature of the battery assembly 41 is regulated while it is being charged when the electric vehicle is stopped (parked), and the battery assembly 41 is positioned in a rear portion of the electric vehicle. Because the battery assembly 41 is cooled by the liquid 12 supplied from the radiator 11 which is located on the front end of the electric vehicle, the piping or passage 15 for circulating the liquid 12 between the radiator 11 and the battery assembly 41 is so long that the efficiency with which the temperature of the battery assembly 41 is regulated is lowered due to a heat exchange that occurs in the piping or passage 15. To alleviate the above shortcoming, according to the embodiment shown in FIG. 6, dividing the piping or passage 15 of FIG. 1 into a piping 91 and a piping 92, whereby a radiator 81 dedicated for cooling the battery assembly 41 is placed close to the battery assembly 41 in addition to the radiator 11 for cooling the propulsive motor 22. While the additional radiator 81 is required in addition to the radiator 11, the piping 92 extending between the radiator 81 and the battery assembly 41 is relatively short and therefor the radiator 81 and hence a radiator fan 82 for cooling the radiator 81 may be of a relatively small size. Consequently, the amount of electric energy which is consumed by the radiator fan 82 when the battery assembly 41 is charged may also be small.

Operation of the battery temperature regulating apparatus according to the embodiment shown in FIG. 6 will be described below. Those components of FIG. 6 that are the same as in the embodiment of FIG. 1 are numbered the same and those that are similar are provided with a suffix "A" to the number.

For cooling the battery assembly 41, the electric heater 45 is turned off, and the directional control solenoid-operated valve 32A is closed as shown in FIG. 6, disconnecting passageways 15n, 15o from each other. Then, the auxiliary pump 44 is operated, and when the battery temperature Tb is too high the radiator fan 82 is rotated to cool the radiator 81, to circulate the liquid 12A in the direction indicated by the arrow "c" to cool the battery assembly 41 through a heat exchange achieved by the jacket 33.

The battery assembly 41 is forcibly cooled unconditionally when the battery temperature Tb is equal to or higher than 35° C. The battery assembly 41 is also forcibly cooled when the battery temperature Tb drops from 35° C. to 28° C. When the battery temperature Tb is equal to or less than 28° C., the radiator fan 82 is stopped and the auxiliary pump 44 is also stopped, allowing the battery assembly 41 to be cooled by itself. At this time, the auxiliary pump 44 may be operated if required in view of the battery temperature Tb.

When the battery temperature Tb becomes equal to or less than 20° C. (or 15° C. in an on-off control operation with hysteresis), the battery assembly 41 is warmed.

For warming the battery assembly 41, the electric heater 45 is turned on, and the directional control solenoid-operated valve 32A is opened, bringing the passageways 15n, 15o into communication with each other. The radiator fan 82 is stopped.

Then, the auxiliary pump 44 is actuated, and the liquid 12A is warmed by the electric heater 45. The warmed liquid 12A is supplied to the jacket 33 to warm the battery assembly 41 through a heat exchange effected by the jacket 33. When the battery temperature Tb of the warmed battery assembly 41 reaches 20° C. again, the directional control solenoid-operated valve 32A is closed again, and the battery assembly 41 is cooled by itself with the electric heater 45 turned off, the auxiliary pump 44 stopped, and the radiator fan 82 stopped. When the battery temperature Tb reaches 35° C., the battery assembly 41 is forcibly cooled again as described above.

With the arrangement of the present invention, as described above, the passage (heat-exchange fluid path) is disposed close to the battery assembly on the electric vehicle, and is supplied with the temperature regulating liquid (heat- exchange fluid) for regulating the temperature of the battery assembly. Therefore, the battery temperature regulating apparatus according to the present invention is capable of regulating the battery temperature more efficiently than the conventional apparatus which applies hot air or cool air to the battery assembly to warm or cool the battery assembly. Specifically, the amount of electric energy consumed to regulate the battery temperature by the battery temperature regulating apparatus according to the present invention is smaller than the amount of electric energy consumed by the conventional apparatus.

Since the temperature regulating liquid is supplied to the battery assembly, it is easy to control the battery charging process for charging the battery assembly in a temperature range optimum for the charging of the battery assembly regardless of variations in the ambient temperature. This prevents the batteries from suffering an undue reduction in the service life because the negative electrode is prevented from being sulfated and the positive electrode is prevented from being corroded at high temperatures.

Since the capacity of the batteries is not lowered when they are charged, they can give the electric vehicle the longest mileage possible.

Although certain preferred embodiments of the present invention have been shown and described in detail, it should

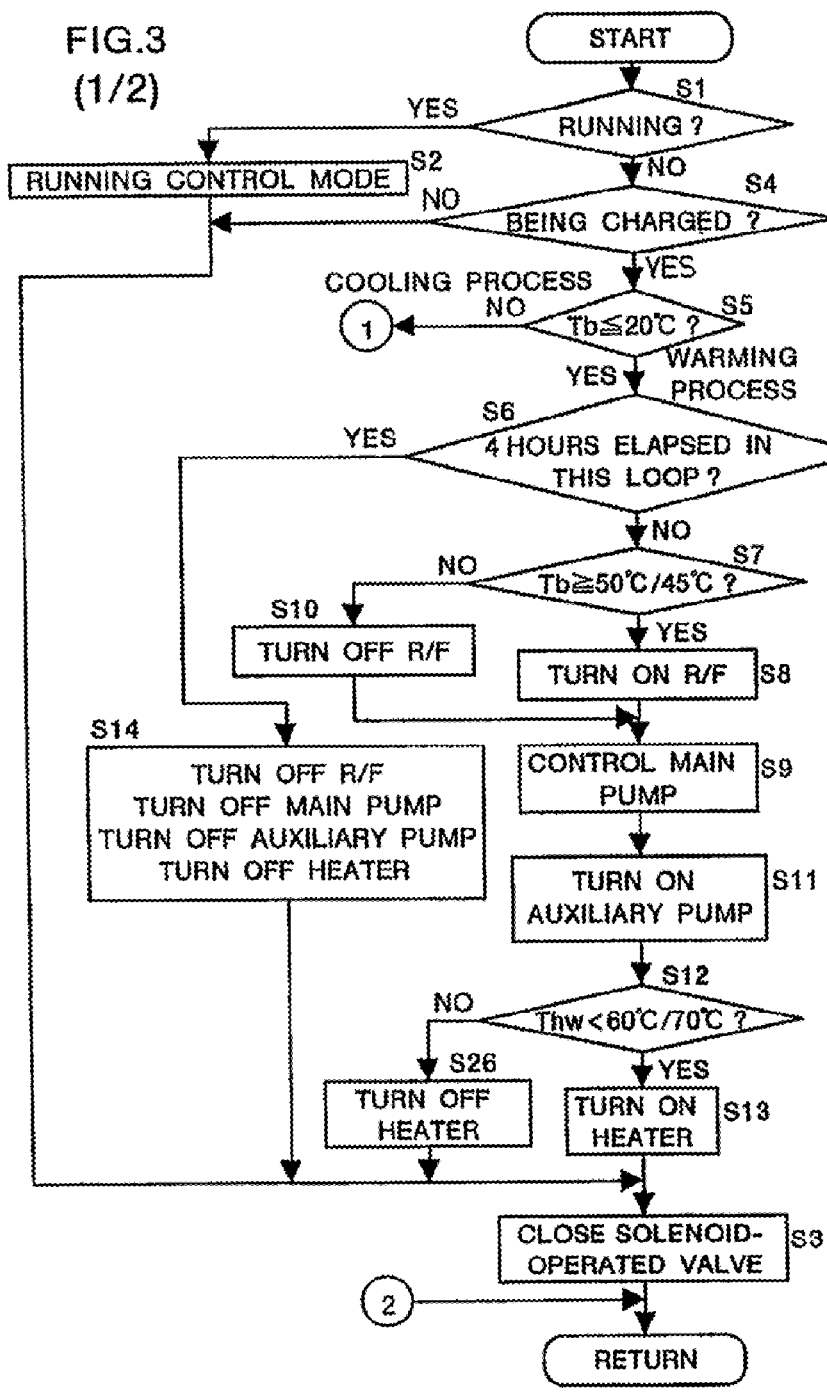

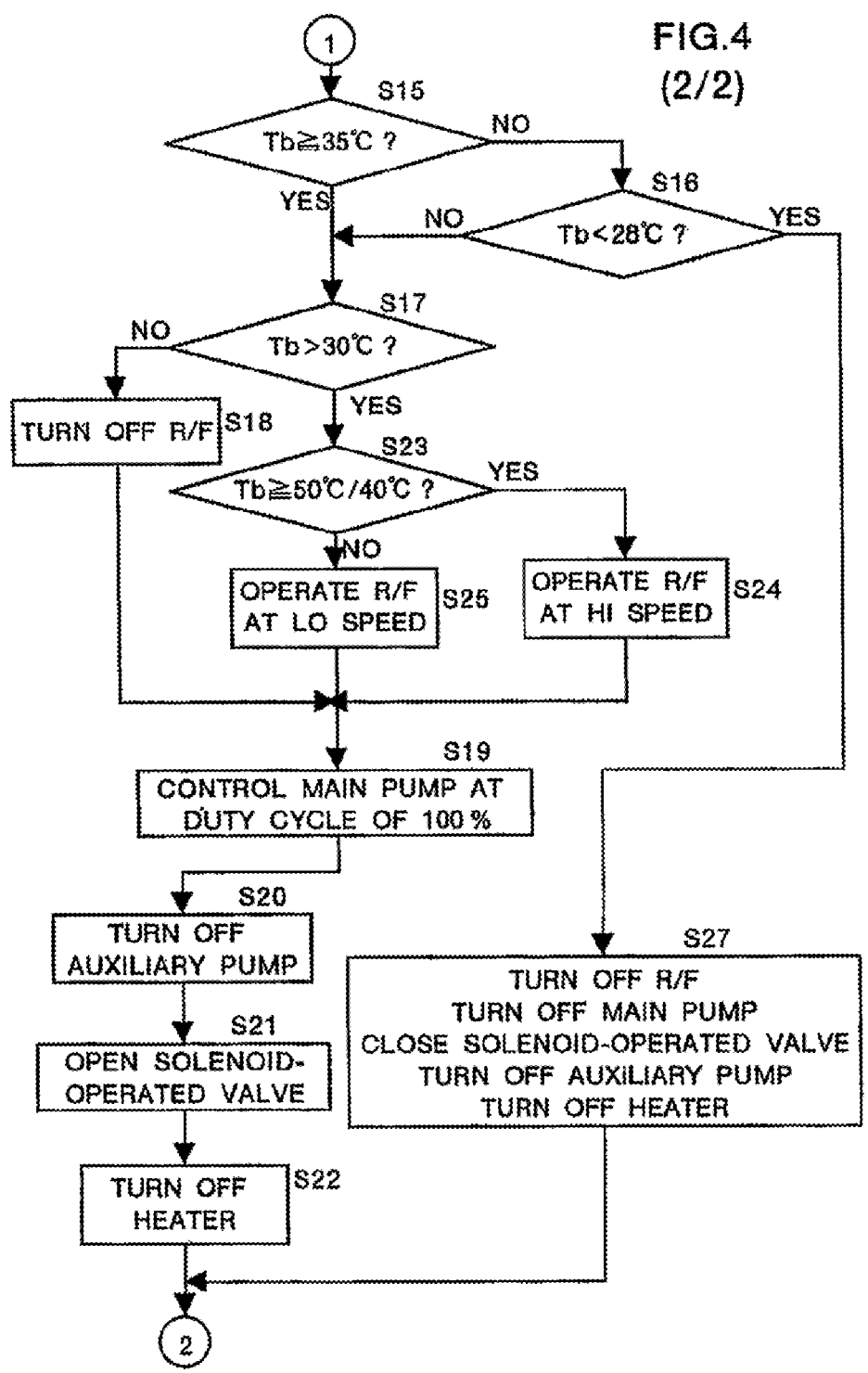

What is claimed is:

1. An apparatus for regulating the temperature of a battery assembly mounted as a power source on an electric vehicle, comprising:

an electric motor on the electric vehicle for being powered by the battery assembly and driving the electric vehicle:

a battery box housing a plurality of battery casings of a battery assembly;

a heat-exchange fluid path disposed in said battery box in contact with said battery casings and disposed in heat-exchange contact with the electric motor;

a heater disposed outside of said battery box for heating a heat-exchange fluid flowing through said heat-exchange fluid path; and a radiator disposed outside of said battery box for cooling a heat-exchange fluid flowing through said heat-exchange fluid path;

whereby the electric motor and the battery assembly can be cooled by said radiator through the heat-exchange fluid, and said battery assembly can be heated by said heater through the heat-exchange fluid.

2. An apparatus according to claim 1, further comprising a solenoid-operated valve connected between said heat-exchange fluid path disposed in said battery box, said heater, and said radiator, for bringing said heat-exchange fluid path disposed in said battery box into communication with said heater when said solenoid-operated valve is not supplied with an electric current.

3. An apparatus according to claim 1, further comprising:

a directional control valve connected between said heat-exchange fluid path disposed in said battery box, said heater, and said radiator;

a battery temperature sensor disposed in said battery box for detecting a battery temperature;

a radiator fan disposed in facing relation to said radiator; and cooling control means for controlling said directional control valve to bring said heat-exchange fluid path disposed in said battery box into communication with said radiator and operating said radiator fan when said battery temperature is above a predetermined temperature.

4. An apparatus according to claim 1, further comprising:

a directional control valve connected between said heat-exchange fluid path disposed in said battery box, said heater, and said radiator;

a battery temperature sensor disposed in said battery box for detecting a battery temperature;

a radiator fan disposed in facing relation to said radiator; and cooling control means for controlling said directional control valve to bring said heat-exchange fluid path disposed in said battery box into communication with said radiator and controlling said radiator fan to rotate selectively in a succession of different speeds depending on said battery temperature when said battery temperature is above predetermined temperature (35° C).

5. An apparatus according to claim 1, further comprising:

a battery temperature sensor disposed in said battery box for detecting a battery temperature; and heating control means for operating said heater when said battery temperature is below a predetermined temperature.

6. An apparatus according to claim 1, further comprising:

a directional control valve connected between said heat-exchange fluid path disposed in said battery box, said heater, and said radiator; and heating control means for operating said heater and controlling said directional control valve to bring said heater into communication with said heat-exchange fluid path disposed in said battery box when said battery temperature is below a predetermined temperature.

7. An apparatus according to claim 1, further comprising:

a battery temperature sensor disposed in said battery box for detecting a battery temperature; and heating control means for operating said heater for a predetermined period of time when said battery temperature is below a predetermined temperature.

8. An apparatus according to claim 1, further comprising:

a directional control valve connected between said heat-exchange fluid path disposed in said battery box, said heater, and said radiator; and heating control means for operating said heater for a predetermined period of time and controlling said directional control valve to bring said heater into communication with said heat-exchange fluid path disposed in said battery box when said battery temperature is below a predetermined temperature.

9. An apparatus according to claim 1, further comprising:

a battery temperature sensor disposed in said battery box for detecting a battery temperature;

heating control means for operating said heater for a predetermined period of time when said battery temperature is below a first predetermined temperature;

a heated-fluid temperature detector disposed downstream of said heater for detecting a temperature of said heatexchange fluid; and heater inactivating means in said heating control means, for inactivating said heater when the temperature of said heat-exchange fluid exceeds a second predetermined temperature.

10. An apparatus according to claim 1, further comprising:

a directional control valve connected between said heat-exchange fluid path disposed in said battery box, said heater, and said radiator; and heating control means for operating said heater for a predetermined period of time and controlling said directional control valve to bring said heater into communication with said heat-exchange fluid path disposed in said battery box when said battery temperature is below a first predetermined temperature;

a heated-fluid temperature detector disposed downstream of said heater for detecting a temperature of said heatexchange fluid; and heater inactivating means in said heating control means, for inactivating said heater when the temperature of said heat-exchange fluid exceeds a second predetermined temperature.

11. An apparatus according to claim 1, further comprising:

a directional control valve connected between said heat-exchange fluid path disposed in said battery box, said heater, and said radiator;

a battery temperature sensor disposed in said battery box for detecting a battery temperature;

a radiator fan disposed in facing relation to said radiator; and cooling control means, having operation limiting means operable only while said battery assembly is being charged, for controlling said directional control valve to bring said heat-exchange fluid path disposed in said battery box into communication with said radiator and operating said radiator fan when said battery temperature is above a predetermined temperature.

12. An apparatus according to claim 1, further comprising:

a battery temperature sensor disposed in said battery box for detecting a battery temperature; and heating control means, having operation limiting means operable only while said battery assembly is being charged, for operating said heater when said battery temperature is at most a second predetermined temperature.

13. An apparatus according to claim 1, further comprising:

a directional control valve connected between said heat-exchange fluid path disposed in said battery box, said heater, and said radiator; and heating control means, having operation limiting means operable only while said battery assembly is being charged, for operating said heater and controlling said directional control valve to bring said heater into communication with said heat-exchange fluid path disposed in said battery box when said battery temperature is below a predetermined temperature.

14. An apparatus according to claim 1, further comprising:

a directional control valve connected between said heat-exchange fluid path disposed in said battery box, said heater, and said radiator;

a fluid temperature detector for detecting a temperature of the heat-exchange fluid proximate said radiator;

a radiator fan disposed in facing relation to said radiator; and cooling control means for controlling said directional control valve to bring said heat-exchange fluid path disposed in said battery box into communication with said radiator and operating said radiator fan when said battery temperature is above a predetermined temperature.

15. An apparatus according to claim 1, further comprising:

a directional control valve connected between said heat-exchange fluid path disposed in said battery box, said heater, and said radiator;

a fluid temperature detector for detecting a temperature of the heat-exchange fluid proximate said radiator;

a radiator fan disposed in facing relation to said radiator; and cooling control means for controlling said directional control valve to bring said heat-exchange fluid path disposed in said battery box into communication with said radiator and controlling said radiator fan to rotate selectively in a succession of different speeds depending on said temperature of the heat-exchange fluid when said battery temperature is above a predetermined temperature.

16. An apparatus for regulating the temperature of a battery assembly mounted as a power source on an electric vehicle, comprising:

a battery box housing a plurality of battery casings of a battery assembly;

a heat-exchange fluid path disposed in said battery box in contact with said battery casings;

a heater disposed outside of said battery box for heating a heat-exchange fluid flowing through said heat-exchange fluid path;

a radiator disposed outside of said battery box for cooling a heat-exchange fluid flowing through said heat-exchange fluid path;

a battery temperature sensor disposed in said battery box for detecting a battery temperature;

heating control means for operating said heater for a predetermined period of time when said battery temperature is below a first predetermined temperature;

a heated-fluid temperature detector disposed downstream of said heater for detecting a temperature of said heat-exchange fluid; and heater deactivating means in said heating control means, for deactivating said heater when the temperature of said heat-exchange fluid exceeds a second predetermined temperature.

17. An apparatus for regulating the temperature of a battery assembly mounted as a power source on an electric vehicle, comprising:

a battery box housing a plurality of battery casings of a battery assembly;

a heat-exchange fluid path disposed in said battery box in contact with said battery casings;

a heater disposed outside of said battery box for heating a heat-exchange fluid flowing through said heat-exchange fluid path;

a radiator disposed outside of said battery box for cooling a heat-exchange fluid flowing through said heat-exchange fluid path;

a battery temperature sensor disposed in said battery box for detecting a battery temperature; and heating control means, having operation limiting means operable only while said battery assembly is being charged, for operating said heater when said battery temperature is below a predetermined temperature.

18. An apparatus according to claim 17, further comprising:

a directional control valve connected between said heat-exchange fluid path disposed in said battery box, said heater, and said radiator, wherein said operation limiting means is operable only while said battery assembly is being charged, thereby further controlling said directional control valve to bring said heater into communication with said heat-exchange fluid path disposed in said battery box when said battery temperature is below a predetermined temperature.

19. An apparatus according to claim 17, further comprising:

a directional control valve connected between said heat-exchange fluid path disposed in said battery box, said heater and said radiator;

a radiator fan disposed in facing relation to said radiator; and cooling control means for controlling said directional control valve to bring said heat-exchange fluid path disposed in said battery box into communication with said radiator and operating said radiator fan when said battery temperature is above a predetermined temperature.

20. An apparatus for regulating the temperature of a battery assembly mounted as a power source on an electric vehicle, comprising:

a battery box housing a plurality of battery casings of a battery assembly;

a heat-exchange fluid path disposed in said battery box in contact with said battery casings;

a heater disposed outside of said battery box for heating a heat-exchange fluid flowing through said heat-exchange fluid path;

a radiator disposed outside of said battery box for cooling the heat-exchange fluid flowing through said heat-exchange fluid path;

a directional control valve connected between said heat-exchange fluid path disposed in said battery box, said heater and said radiator;

a battery temperature sensor disposed in said battery box for detecting a battery temperature;

a radiator fan disposed in facing relation to said radiator;

a fluid temperature detector for detecting a temperature of the heat-exchange fluid proximate said radiator; and cooling control means for controlling said directional control valve to bring said heat-exchange fluid path disposed in aid battery box into communication with said radiator and operating said radiator fan when said battery temperature is above a predetermined temperature, wherein said cooling control means further controls said radiator fan to rotate selectively in a succession of different speeds depending on said temperature of the heat-exchange fluid when said battery is above said predetermined temperature.

21. An apparatus for regulating the temperature of a batter assembly mounted as a power source on an electric vehicle, comprising:

a battery box housing a plurality of battery casings of a battery assembly;

a heat-exchange fluid path disposed in said battery box in contact with said battery casings;

a heater disposed outside of said battery box for heating a heat-exchange fluid flowing through said heat-exchange fluid path;

a radiator disposed outside of said batter box for cooling a heat-exchange fluid flowing through said heat-exchange fluid path;

a directional control valve connected between said heat-exchange fluid path disposed in aid battery box, said heater and said radiator;

a battery temperature sensor disposed in said battery box for detecting a battery temperature;

a radiator fan disposed in facing relation to said radiator; and cooling control means for controlling said directional control valve to bring said heat-exchange fluid path disposed in said battery box into communication with said radiator and operating said radiator fan when said battery temperature is above a predetermined temperature, wherein said cooling control means further controls said radiator fan to rotate selectively in a succession of different speeds depending on said battery temperature when said battery temperature is above said predetermined temperature.

* * * * *

UNITED STATES PATENT AND TRADEMARK OFFICE
CERTIFICATE OF CORRECTION

| | |
|---|---|
| PATENT NO. | : 5,834,132 |
| APPLICATION NO. | : 08/552977 |
| DATED | : November 10, 1998 |
| INVENTOR(S) | : Hasegawa et al. |

It is certified that error appears in the above-identified patent and that said Letters Patent is hereby corrected as shown below:

Claim 4, line 15 and 16 (Col. 13, line 63-64), delete "(35° C)."

Claim 9, line 9 (Col. 14, line 39), delete "heatexchange" and substitute -- heat-exchange --.

Claim 12, line 18 (Col. 15, line 19) delete "at most" and insert -- below a --.

Signed and Sealed this

Twenty-eighth Day of August, 2007

JON W. DUDAS
*Director of the United States Patent and Trademark Office*